(12) United States Patent
Johns

(10) Patent No.: US 6,455,084 B2
(45) Date of Patent: Sep. 24, 2002

(54) MICROWAVABLE STEAMER BAGS

(76) Inventor: John Jay Johns, P.O. Box 70, Nogal, NM (US) 88341

( * ) Notice: Subject to any disclaimer, the term of this patent is extended or adjusted under 35 U.S.C. 154(b) by 0 days.

(21) Appl. No.: 09/858,559

(22) Filed: May 17, 2001

Related U.S. Application Data

(60) Provisional application No. 60/205,075, filed on May 18, 2000.

(51) Int. Cl.⁷ .................. B65B 25/22; B65B 29/08; B65D 81/34
(52) U.S. Cl. .................. 426/107; 426/113; 426/124; 426/234; 426/393
(58) Field of Search .................. 426/107, 113, 426/234, 112, 124, 393

(56) References Cited

U.S. PATENT DOCUMENTS

| | | | |
|---|---|---|---|
| 2,495,435 A | * 1/1950 | Welch | 426/234 |
| 2,600,566 A | * 6/1952 | Moffett | 426/234 |
| 2,714,070 A | * 7/1955 | Welch | 426/234 |
| 3,672,907 A | * 6/1972 | Hudson | 426/120 |
| 3,821,915 A | 7/1974 | Larrable | |
| 3,854,023 A | * 12/1974 | Levinson | 426/107 |
| 4,316,070 A | 2/1982 | Prosise et al. | |
| 4,390,554 A | * 6/1983 | Levinson | 426/107 |
| 4,390,555 A | * 6/1983 | Levinson | 426/234 |
| 4,419,373 A | * 12/1983 | Opperman | 426/113 |
| 4,596,713 A | 6/1986 | Burdette | |
| 4,602,975 A | 7/1986 | Larsonneur | |
| 4,701,156 A | 10/1987 | Larsonneur | |
| 4,735,846 A | 4/1988 | Larsonneur | |
| 4,762,113 A | 8/1988 | Hamasaki | |
| 4,770,920 A | 9/1988 | Larsonneur | |
| 4,786,513 A | * 11/1988 | Monforton et al. | 426/107 |
| 4,803,088 A | 2/1989 | Yamamoto et al. | |
| 4,865,854 A | 9/1989 | Larson | |
| 4,874,620 A | 10/1989 | Mendenhall et al. | |
| 4,890,439 A | * 1/1990 | Smart | 426/234 |
| 4,925,684 A | 5/1990 | Simon | |
| 4,961,944 A | * 10/1990 | Matoba et al. | 426/107 |
| 4,987,280 A | 1/1991 | Kanafani et al. | |
| 5,081,330 A | 1/1992 | Brandberg et al. | |
| 5,096,722 A | 3/1992 | Bair | |
| 5,252,374 A | 10/1993 | Larsonneur | |
| 5,317,118 A | 5/1994 | Brandberg et al. | |
| 5,320,895 A | 6/1994 | Larsonneur et al. | |
| 5,370,042 A | 12/1994 | Tolchin et al. | |
| 5,376,392 A | 12/1994 | Ikegami et al. | |
| 5,414,248 A | 5/1995 | Phillips | |
| 5,522,809 A | 6/1996 | Larsonneur | |
| 5,945,021 A | 8/1999 | Chung | |

FOREIGN PATENT DOCUMENTS

| | | |
|---|---|---|
| JP | 62-191675 | * 12/1987 |
| JP | 63-131926 | * 6/1988 |
| JP | 3-226477 | * 10/1991 |
| JP | 5-178377 | * 7/1993 |
| JP | 5-268885 | * 10/1993 |
| JP | 5-268886 | * 10/1993 |
| JP | 6-153821 | * 6/1994 |
| JP | 7-69384 | * 3/1995 |
| JP | 7-330044 | * 12/1995 |
| JP | 11-139463 | * 5/1999 |

* cited by examiner

Primary Examiner—Steve Weinstein
(74) Attorney, Agent, or Firm—Staas & Halsey LLP

(57) ABSTRACT

Packaging for microwavable convenience foods, such as tamales, and a related method for microwave steam heating or cooking of such foods. The food packaging includes an unvented, sealed, stretchable plastic bag enclosing a food product and a moisture pad which is placed on top of the food product. The pad serves to shield the food product from direct microwave radiation, and to provide a source of steam generated by absorption of the waves in the water of the pad.

27 Claims, 3 Drawing Sheets

MICROWAVABLE STEAMER BAGS

The present application claims the benefit under 35 U.S.C. Section 119(e) of U.S. Provisional Patent Application Ser. No. 60/205,075, entitled MICROWAVABLE STEAMER BAGS AND OVENABLE STEAMER BAGS, filed May 18, 2000, which is hereby incorporated by reference in its entirety into this application.

BACKGROUND OF THE INVENTION

This invention relates to food packaging and, more particularly, to a microwavable bag for steaming foods.

The Mexican food known as a tamale (e.g., corn masa with a meat or vegetable filling) is best cooked or reheated by steaming. If such a food product is microwaved in a conventional microwave package, i.e., a plastic bag, Mylarm or an oxygen barrier film, its outer portions become brown and dry, rendering the product unappetizing. Also, the bag may break due to the steam pressure, which results in incomplete steam cooking and/or further browning or drying. If the bag is instead cut prior to use, so as to prevent splitting of the bag during heating, the tamale cannot be steam heated.

Efforts have been made to provide bags with internal moisture sources for steam cooking. For example, Japanese Reference No. 62-191675 describes a bag, most likely a Mylar™ or metallic, having a water absorbent pad under the food product in an attempt to facilitate steam cooking of the contents. Such bags are believed designed for an electric range top using dry heat. They either do not expand under steam pressure in a microwave environment, and burst, unless vented, or are non-compatible with microwave energy, e.g., the metallized nature of the bag prevents its use in a microwave oven. The pad is intentionally placed under the food product since electric ranges heat from below. Of course, since the food product sits on the water absorbent food, it is possible that the food will absorb the water during storage and transportation, which may result in a soggy food product. See, e.g., U.S. Pat. No. 5,376,392, col. 2, lines 41–51. Since the food is uncovered by the absorbent pad, if it were used in a microwave environment where the rays emanate to the sides and top of the food product, the sides and top of the food product may still be susceptible to drying and browning from the microwave exposure. Further, such Mylar™, oxygen barrier film, and metallic bags are very expensive to manufacture.

SUMMARY OF THE INVENTION

It is a purpose of the present invention to provide packaging which results in hot steaming foods, without using an external source of steam, and without having to open the packaging prior to heating.

It is also a purpose of the present invention to provide food packaging which prevents contamination of the food, and the microwave oven, by remaining aseptically sealed during the entire heating process and up to consumption.

It is another purpose of the present invention to provide food packaging that can be microwaved without the food becoming dry or brown, thereby providing a more appetizing food appearance and texture.

It is a further purpose of the present invention to provide a microwave food packaging that can be steam heated and held unopened, to retain for a longer period of time the steam heat, prior to the need for consumption.

It is also a purpose of the present invention to provide food packaging with a water absorbent pad on the top of the food product, which pad shields the food product from uneven microwave energy.

It is, in addition, a purpose of the present invention to provide a ventless, steamable microwave food packaging which retains all of the steam therein to better cook the food product, and provides a more sanitary microwave oven by not allowing release of water condensation into the oven.

It is also a purpose of the present invention to provide a method for steam heating or cooking foods which is more efficient, and leads to a more palatable food product.

Finally, it is a-purpose of the present invention to provide a less equipment and laborintensive food steaming method.

To achieve the foregoing and other purposes of the present invention there is provided a packaging for food, particularly microwavable convenience foods, and a related method for microwave heating or cooking of such foods. The food packaging includes a bag for enclosing a food product and a moisture pad which is placed on top of the food product. The bag is a stretchable plastic, but is unvented to retain all of the steam. The pad is a material that can absorb water and can release the water as steam into the bag. The pad is preferably moistened with purified water prior to insertion in the bag. The bag is preferably a rectangle made of an elongated tubular sheet sealed at one end, preferably by heat sealing, filled with the food product, with the moistened pad on the top thereof, and sealed at the other end. The pad serves to shield the food product from direct microwave radiation, and to provide a source of steam generated by absorption of the microwaves in the water of the pad.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The present invention is packaging for food, particularly microwavable convenience foods, and a related method for microwave steam heating of such foods. By "heating" it is meant a temperature sufficient to either re-heat a pre-cooked food product, or to originally cook a food product, as needed. The preferred embodiments will now be described with reference to FIGS. 1–5.

Figure 1:
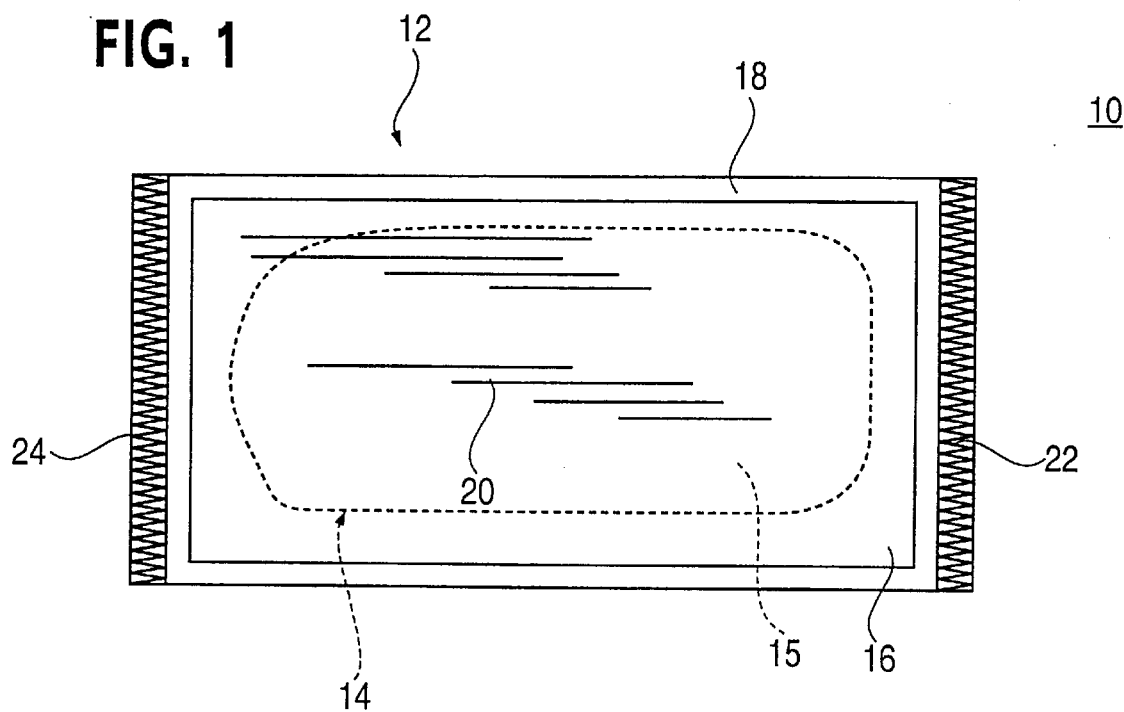
FIG. 1 is a top view of the food packaging according to the present invention.
Figure 2:
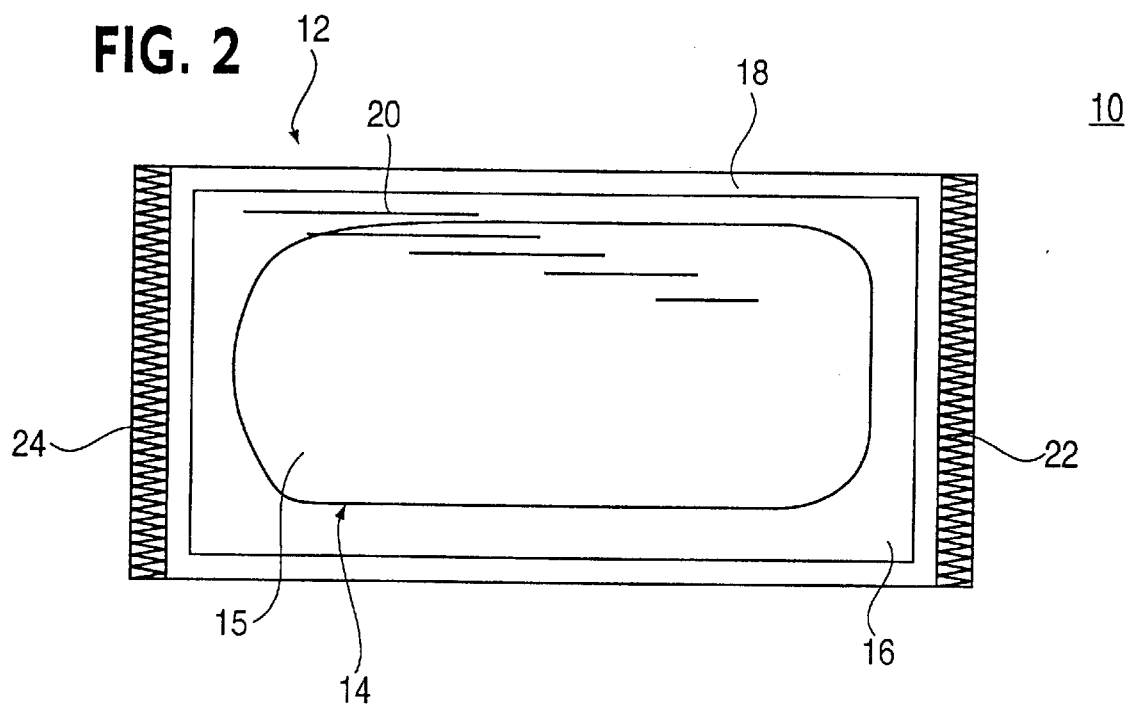
FIG. 2 is a bottom view of the food packaging.

FIGS. 1 and 2 show the preferred embodiment of the present invention, with FIG. 1 illustrating a top view, and FIG. 2 illustrating a bottom view. As shown generally therein, the food packaging 10 includes a bag 12 enclosing a food product 14 and a moisture pad 16.

More particularly, the packaging 10 contains a sheet 18 that forms the bag 12. The sheet 18 is a stretchable polymer film, such as a polyethylene-based plastic. For example, the sheet 18 could be laminar, including polyethylene and known additives, e.g., Selin™. These additives impart, e.g., improved strength or oxygen barrier properties to the polyethylene.

The thickness of the sheet 18, as would be known in the art, is dependent upon the weight, size and density of the food product, the temperature of the food product when steam heating begins, and the desired finished heating temperature. Preferably the thickness is about 2.5 to 5 mil. In this regard, it has been found that about a 3 mil bag is adequate for lower power microwave ovens, or on the lower power setting of a commercial microwave oven, especially with relatively lower weight food products (such as a 1–2 oz. appetizer tamale), to prevent breakage of the plastic material from steam pressure. With greater power and a higher weighted food product, such as a multiple serving tamale pie, a 4–5 mil plastic is preferred.

The sheet 18 may contain indicia 20 thereon, such as advertising, preparation instructions and warnings, product description, nutrition information, etc.

The food product 14 can include such convenience food items as a meat or vegetable tamale wrapped in a corn husk, a soft taco, a rice item or vegetables in a container, etc.

The pad 16 is absorbent and serves as a "sacrificial" moisture pad, as described below. The pad 16 is much like the pads placed under poultry and meat during retail display to absorb fluids juices and blood), and thereby improve the appearance of the poultry and meat. An example of a commercially available and acceptable pad is offered by Paper-Pak Products, Inc., which is sold under the "Zap Super Soaker™" brand. The use of such an absorbent pad is preferred because only one side (16a in FIG. 4) of the pad 16 is absorbent. The other side (16b in FIG. 4) is impermeable to moisture. Therefore, such a pad can be laid directly over the food product 14 with the impermeable side 16b facing the food product 14, so that the food product 14 does not get soggy during storage, transportation or heating.

Other materials capable of absorbing moisture would also be suitable as the pad 16, such as paper, cellulose, cloth, etc., as long as the water is absorbed, and can be emitted freely as steam into the bag 12 to steam the food product 14, and as long as the material is not toxic and otherwise would not damage the food product 14 or bag 12. In any case, the pad 16 should be USDA or FDA approved, as it is used with a food product 14.

The pad 16 is preferably moistened with purified water, placed over the food product 14, placed in the bag 12, sealed and then frozen. In the preferred embodiment, only one pad 16 is placed on top of the food product 14.

The pad 16 is preferably configured such that it extends beyond the perimeter of the food product 14.

Once the bag 12 is filled with the food product 14 and the pad 16, the bag 12 is sealed to capture the moisture. Sealing could be done conventionally by, e.g., heat sealing or adhesive. The sealed bag 12 is unvented, and rendered essentially air tight. That is, plastic films are not necessarily impervious to fluid exchange. Other than this inherent fluid exchange property, there should be no openings in the sheet 18 to allow steam escape.

The sealed packaging 10 is then quick frozen to prolong the shelf life of the food product 14, and to make the food product 14 less easily damaged during handling and shipping. In this regard, the packaging 10 is preferably packed and shipped frozen to convenience stores, supermarkets, etc., with the absorbent pad 16 on the top. Therefore, should the packaging 10 thaw to some extent during shipping and handling, the food product 14 will not be sitting on the pad 16 and therefore get soggy, as in the prior art.

More particularly, in the preferred embodiment shown in FIGS. 1 and 2, the bag 12 is elongated, and somewhat flat, although many shapes and sizes would be known to one of ordinary skill in the art. A suggested size of the bag 12 is about 4 inches wide and about 8½ inches long. The food packaging 10 is made with about 3–5 mil polyethylene sheet 18 into a bag 12 form. That is, the bag 12 is preferably a rectangle made of an elongated tubular sheet sealed at one end 22, preferably by heat sealing, filled at the opposite open end 24 with the food product 14, such as a pre-cooked 4 ounce meat tamale wrapped in a natural corn husk 15, and the moistened pad 16, which is preferably a rectangle about 3½ inches by 7 inches, and sealed at the end 24.

Figure 3:
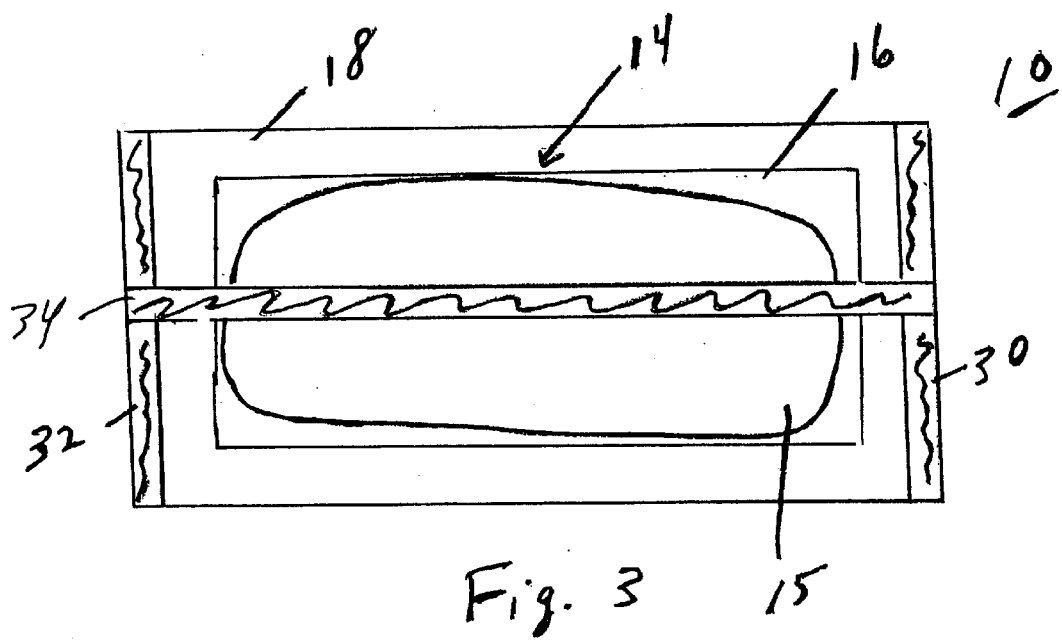
FIG. 3 is a bottom view of an alternate embodiment of the food packaging.

Alternatively, as shown in FIG. 3, the bag 12 can instead be made of a single, elongated, flat sheet 18 folded over itself, wherein one end 30 is sealed, and an overlapping longitudinal edge 34 is sealed, leaving an open, opposite end 32 in which to insert the food product 14 and pad 16. Thereafter, the end 32 is sealed.

Figure 4:
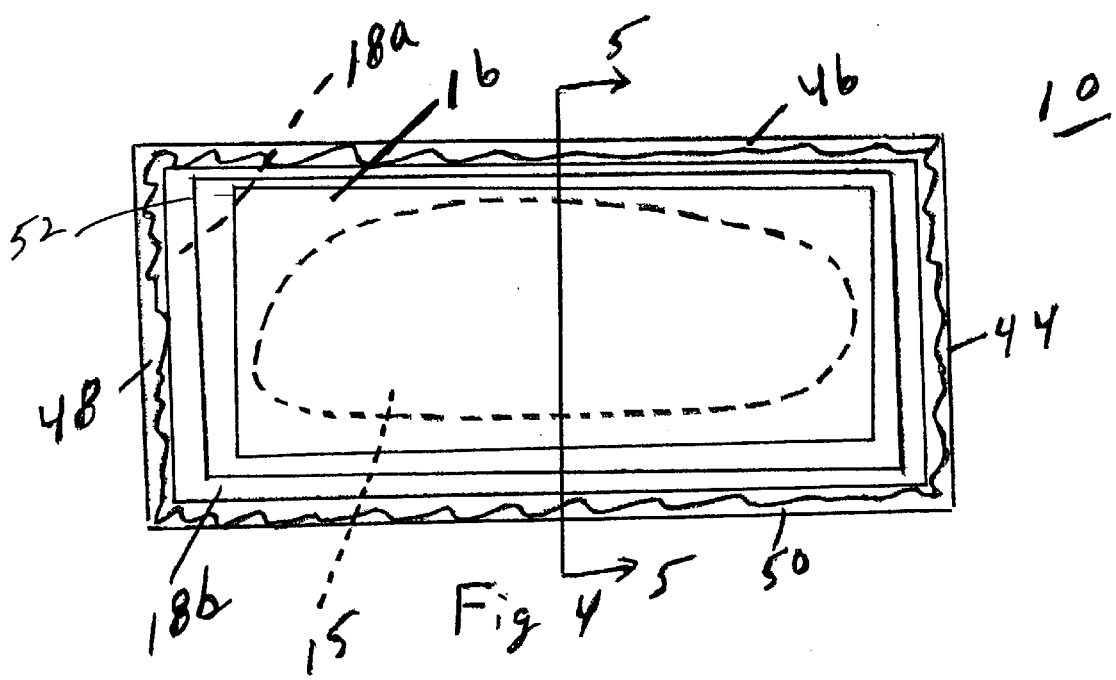
FIG. 4 is a bottom view of still another embodiment of the food packaging.
Figure 5:
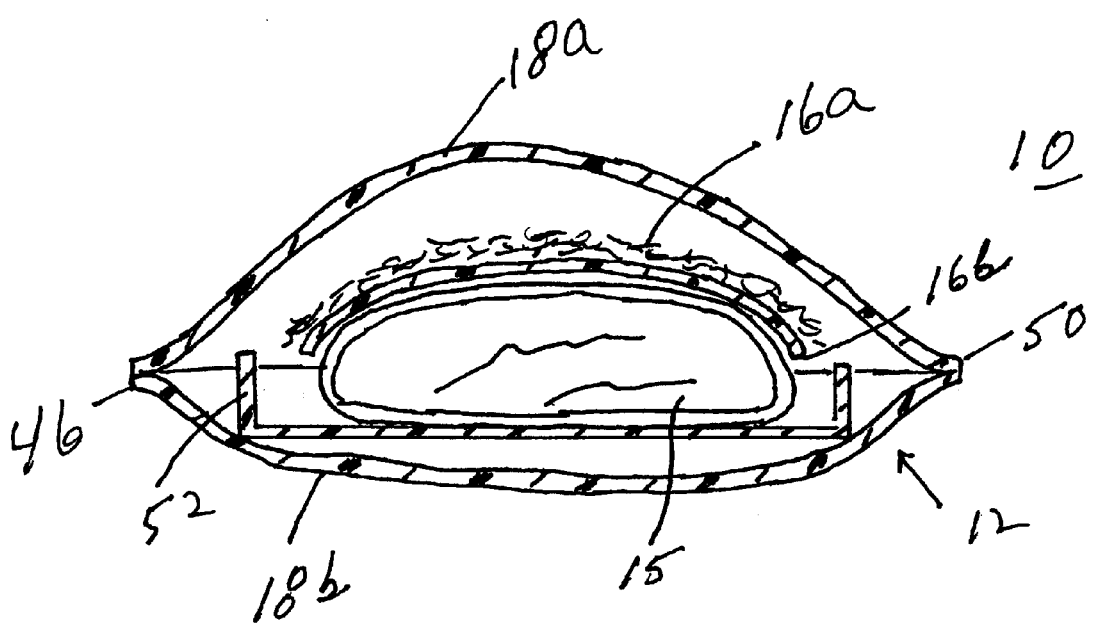
FIG. 5 is a side, cross sectional view of the food packaging shown in FIG. 4, taken along line 5–5.

In another embodiment shown in FIGS. 4 and 5, the food product 14 and the pad 16 are placed on a lower sheet 18b, an upper sheet 18a is placed thereon, and all four sides 44, 46, 48 and 50 are sealed.

Of course, lower sheet 18b and upper sheet 18a could be sealed along only three sides, e.g., 44, 46 and 48, the food product 14 and pad 16 inserted in the remaining open end 50, and the end 50 sealed, as desired.

Any conventional bag-making machine capable of sealing polyethylene or other steam stretchable films can be used. The methods of fabricating the bag, i.e., sealed tubes and sheets described above, are commonly used for convenience food packaging due to their relative high speed and low cost. Another method is the use of a roll stock machine that seals all four sides using heat.

The purpose for using the pad 16 is not for its conventional use, i.e., to absorb fluids emanating from food. Conversely, the pad 16 is a storage container for purified water, which serves as the water source to attract microwaves, thereby creating steam therefrom. In this way, the bag 16 is a self-contained steamer for foods. For microwave cooking, because water is being added via the pad 16 and turned to steam, the water already in the food product 14 is less likely to be evaporated, which would cause the food product 14 to undesirably brown or dry out from the loss of its inherent moisture. Further, the pad 16 and the steam diffuse the microwave energy, thereby creating a more evenly heated food product 14.

It should not be necessary to add a vent to the packaging 10, as used in some conventional microwave bags, since the bag 12 will expand with the steam generation. Also, it is not necessary to cut the bag 12 prior to heating, as is usually the case with microwave cooking bags. Opening the bag 12 would, in fact, frustrate the steam generation capabilities of the present invention.

In order to steam the food product 14, the purchaser would put the frozen or thawed food packaging 10 into the microwave. The side of the packaging 10 with the pad 16 thereon (e.g., the upper sheet 18a in FIG. 4) faces up in the microwave, and the bottom of the bag 12 (e.g., sheet 18b in FIG. 4), rests on the microwave shelf. As noted above, the bag 12 should not be opened prior to heating, unlike conventional food packaging.

The microwave heating is applied, e.g., for a thawed tamale weighing 4 oz., at "high" (1000 watts) for about 2 mins., and for a frozen tamale of the same weight, at "high" for about 2.5 mins. For a commercial microwave of about 1500 watts, these times are each reduced by about 15 seconds. The water turns to steam in the package 10, to steam the food product 14, and the plastic of the bag 12 stretches from the internal steam pressure.

In comparison to the prior art, the relative heating time for a food product 14 is reduced. That is, due to the unvented steam, the heating time is reduced about 10–15% relative to conventional microwave packaging, depending upon the size, density and weight of the food product 14 being heated. Of course, such a reduction in heating time results in improved throughput, reduced energy costs, and reduced number of microwave ovens needed in, e.g., fast food restaurants, convenience stores or institutional food service operations.

Unlike conventional pre-opened packaging used in the microwave, the present closed packaging 10 traps the steam inside the package 10, to steam the food product 14 and keep it hot until the package 10 must be opened for consumption. In the last regard, the present invention allows the holding time of microwave steamed foods to be extended. That is, the packaging retains more steam heat than the prior art packaging, because the present packaging can remain unopened after heating, until the need for consumption. Such an ability to hold heated foods, that still taste freshly steamed, is also a significant benefit to fast food restaurants, institutional food service operations, etc.

Again, since the food packaging 10 is not opened until after the heating is completed, other problems associated with conventional microwave food packaging that is opened prior to heating are eliminated, including contamination of the food from external sources during handling and cooking, and conversely contamination of the microwave oven from the food in an open package that splatters.

As can be seen from the above, the pad 16 serves the purposes of shielding the food product 14 from direct microwave radiation, and serves as a source of steam generation by absorption of the waves in the water of the pad 16. In this way, the water of the pad 16 is sacrificed to prevent the evaporation of the water in the food product 14. More particularly, while microwaves heat the food directly with conventional packaging, the present invention shields the actual food product 14 from the microwaves, and instead creates live steam, thereby keeping the food product 14 moist. This presence of additional moisture from the pad 16 prevents the food product from dehydrating or browning. In these regards, the pad 16 is placed on top of the food product 14, and the food packaging 10 is cooked with the pad 16 on the top. Further, the package 10 is opened only after heating to reveal a hot steaming food product 14, which appears and tastes more like a conventionally steamed product.

Of course, in addition to placing a food product 14, such as a tamale 15, directly into the bag 12, the food product 14 can be received by a cup or other container suitable for microwave use, such as a plastic or foam tray 36, as shown in FIGS. 4 and 5. As a preferred example, a pre-cooked rice dish would be placed in such a cup or tray 52 that is placed in the bag 12 during manufacture thereof, as described above, i.e., prior to sealing the bag 12 and freezing the packaging 10.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. Microwavable food packaging, comprising:
    a plastic bag having an upper portion corresponding to a portion of the packaging that faces substantially upward when the packaging is placed in a microwave oven;
    a food product that is to be heated in a microwave oven for consumption contained in the bag and having an upper portion; and
    a pad contained in the bag, said pad being water absorbent and containing sufficient water to form steam in the bag to heat the food product when the bag is heated in a microwave oven, and being positioned in contact with the upper portion of the food product, below the upper portion of the bag, said pad being dimensioned sufficient to shield at least the upper portion of the food product from direct microwave radiation, and the surface of the pad that contacts the food is moisture impermeable,
    wherein the bag is sealed essentially air tight.

2. The packaging as recited in claim 1, wherein the pad extends slightly beyond a perimeter of the food product.

3. The packaging as recited in claim 1, wherein the food product is selected from a tamale, a soft taco, rice and vegetables.

4. The packaging as recited in claim 1, wherein the food product is contained by a container inside the bag.

5. The packaging as recited in claim 4, wherein the container is one of a cup and tray.

6. The packaging as recited in claim 1, wherein the bag is about 3 to 5 mil thick.

7. Microwavable food packaging, comprising:
    a stretchable plastic bag having an upper portion corresponding to a portion of the packaging that faces substantially upward when the packaging is placed in a microwave oven;
    a food product that is to be heated in a microwave oven for consumption contained in the bag and having an upper portion; and
    a separate pad contained in the bag, said pad being water absorbent and containing sufficient water to form steam in the bag to heat the food product when the bag is heated in a microwave oven, and being positioned between the food product and the upper portion of the bag,
    wherein the pad contacts the upper portion of the food product, said pad being dimensioned sufficient to shield at least the upper portion of the food product from direct microwave radiation, and the surface of the pad that contacts the food is moisture impermeable, and
    wherein the bag is sealed essentially air tight about the food product and the pad.

8. The packaging as recited in claim 7, wherein the pad extends slightly beyond the upper portion of the food product.

9. The packaging as recited in claim 7, wherein the bag is sealed via one of a heat seal and an adhesive.

10. The packaging as recited in claim 7, wherein the food product is selected from a tamale, a soft taco, rice and vegetables.

11. The packaging as recited in claim 7, wherein the bag includes indicia thereon.

12. The packaging as recited in claim 7, wherein the bag is about 3–5 mil thick.

13. Microwavable food packaging, consisting of:

a plastic bag having an upper portion and a lower portion, the upper portion corresponding to a portion of the packaging that faces substantially upward when the packaging is placed in a microwave oven;

a food product that is to be heated in a microwave oven for consumption contained in the bag and having a lower portion that extends in a direction of the lower portion of the bag, and an upper portion; and a separate pad contained in the bag, said pad being water absorbent and containing sufficient water to form steam in the bag to heat the food product when the bag Is heated in a microwave oven, and contacting the upper portion of the food product, below the upper portion of the bag, said pad being dimensioned sufficient to shield at least the upper portion of the food product from direct microwave radiation, and the surface of the pad that contacts the food is moisture impermeable, wherein the bag is essentially air tight.

14. A method for microwave steam heating of a food product, comprising the steps of:

forming packaging as an essentially air tight plastic bag having an upper portion, a food product that is to be heated in a microwave oven for consumption contained in the bag and having an upper portion, and a pad being water absorbent and containing sufficient water to form steam in the bag to heat the food product when the bag is heated in a microwave oven, and being positioned between the upper portion of the food product and the upper portion of the bag and contacting the upper portion of the food product, said pad being dimensioned sufficient to shield at least the upper portion of the food product from direct microwave radiation, and the surface of the pad that contacts the food is moisture impermeable:

placing the packaging, without opening an interior of the packaging to the external air, into a microwave oven, with the upper portion of the bag facing substantially upward; and heating the packaging in the microwave oven so that steam is formed in the bag from the water in the pad to heat the food product.

15. The method as recited in claim 14, wherein between the forming and placing steps, the packaging is frozen.

16. The method as recited in claim 14, wherein the forming step includes the step of heat sealing edges of the bag.

17. The method as recited in claim 14, wherein the food product is chosen to be selected from a tamale, a soft taco, rice and vegetables.

18. The packaging as recited in claim 14, wherein the food product is contained by a container inside the bag.

19. The packaging as recited in claim 14, wherein the container is one of a cup and tray.

20. The method as recited in claim 14, wherein the bag is formed to include indicia thereon.

21. A method for microwave steam heating of a food product, comprising the steps of:

forming packaging as an essentially air tight, stretchable, plastic bag having an upper portion, a food product that is to be heated in a microwave oven for consumption contained in the bag and having an upper portion. and a separate pad being water absorbent and containing sufficient water to form steam in the bag to heat the food product when the bag is heated in a microwave oven, said pad being positioned between the upper portion of the food product and the upper portion of the bag and being in contact with the upper portion of the food product said pad being dimensioned sufficient to shield the food product from direct microwave radiation, and the surface of the pad that contacts the food is moisture impermeable;

freezing the packaging;

placing the frozen packaging, without opening an interior of the packaging to the external air, into a microwave oven, with the upper portion of the bag facing substantially upward; and heating the packaging in the microwave oven so that steam is formed in the bag from the water in the pad to heat the food product.

22. The method as recited in claim 21, wherein, after the heating step, the bag is opened to the external air.

23. The method as recited in claim 21, wherein between the freezing and placing steps, the packaging is thawed.

24. The method as recited in claim 21, wherein the forming step includes the step of heat sealing edges of the bag.

25. The method as recited in claim 21, wherein the food product is chosen to be at least one of a tamale, a soft taco, rice and vegetables.

26. The method as recited in claim 21, wherein the bag is formed from one of a tubular sheet material, a single folded-over flat sheet material, and two superposed flat sheet materials.

27. A method for microwave steam heating of a food product, consisting of the steps of:

forming packaging as an essentially air tight plastic bag having an upper portion, a lower portion, a food product contained in the bag and having an upper portion and a lower portion with the lower portion of the food product that is to be heated in a microwave oven for consumption extending in a direction of the lower portion of the bag, and a separate pad being water absorbent and containing sufficient water to form steam in the bag to heat the food product when the bag is heated in a microwave oven, said pad being positioned between the upper portion of the food product and the upper portion of the bag and being in contact with the upper portion of the food product said pad being dimensioned sufficient to shield at least the upper portion of the food product from direct microwave radiation, and the surface of the pad that contacts the food is moisture impermeable; and freezing the packaging;

placing the packaging, without opening an interior of the packaging to the external air, into a microwave oven, with the upper portion of the bag facing upward;

heating the packaging in the microwave oven so that steam is formed in the bag from the water in the pad to heat the food product; and opening the bag to the external air.

* * * * *